US 011178221B2

(12) United States Patent
Savino et al.

(10) Patent No.: US 11,178,221 B2
(45) Date of Patent: Nov. 16, 2021

(54) METHODS, APPARATUSES AND SYSTEMS FOR CLOUD-BASED DISASTER RECOVERY

(71) Applicant: Storage Engine, Inc., Tinton Falls, NJ (US)

(72) Inventors: Trevor Savino, Seymour, CT (US); James Patrick Hart, Brick, NJ (US); Justin Furniss, Egg Harbor City, NJ (US); Charles Wooley, Sea Girt, NJ (US)

(73) Assignee: Storage Engine, Inc., Tinton Falls, NJ (US)

( * ) Notice: Subject to any disclaimer, the term of this patent is extended or adjusted under 35 U.S.C. 154(b) by 0 days.

(21) Appl. No.: 16/223,987

(22) Filed: Dec. 18, 2018

(65) Prior Publication Data

US 2020/0195712 A1   Jun. 18, 2020

(51) Int. Cl.
*H04L 29/08*   (2006.01)
*G06F 11/14*   (2006.01)
*H04L 29/14*   (2006.01)

(52) U.S. Cl.
CPC ...... *H04L 67/1034* (2013.01); *G06F 11/1464* (2013.01); *G06F 11/1469* (2013.01); *H04L 69/40* (2013.01)

(58) Field of Classification Search
CPC ............. G06F 11/1402; G06F 11/1446; G06F 11/1448; G06F 11/1464; G06F 11/1469; G06F 11/1451; H04L 67/1034; H04L 69/40
See application file for complete search history.

(56) References Cited

U.S. PATENT DOCUMENTS

| 7,321,918 B2 | 1/2008 | Burd et al. |
|---|---|---|
| 8,065,559 B2 | 11/2011 | Kamath et al. |
| 8,387,114 B2 | 2/2013 | Sugarbroad |
| 8,812,904 B2 | 8/2014 | Kamath et al. |
| 8,819,476 B2 | 8/2014 | Roth et al. |
| 8,909,977 B2 | 12/2014 | Morosan et al. |

(Continued)

FOREIGN PATENT DOCUMENTS

| CN | 101309167 A | 11/2008 |
|---|---|---|
| CN | 201479165 U | 5/2010 |

(Continued)

OTHER PUBLICATIONS

Stankovic "What is a SQL Server disaster recovery?", SQLShack, Mar. 14, 2014.

(Continued)

*Primary Examiner* — Matthew M Kim
*Assistant Examiner* — Kurosu Risa Altaf
(74) *Attorney, Agent, or Firm* — Moser Taboada

(57) ABSTRACT

Methods, apparatuses and systems for cloud-based disaster recovery are provided. The method, for example, includes configuring, at a cloud-based computing platform, a declaration including servers associated with a plurality of selected workloads configured based on information provided by a user for corresponding servers used at a client machine, the declaration including generated steps listing the servers, and restoring the servers for each of the generated steps of the declaration upon receiving, from the client machine, a failure indication associated with the servers.

14 Claims, 8 Drawing Sheets

(56) References Cited

U.S. PATENT DOCUMENTS

| | | | |
|---|---|---|---|
| 9,092,248 B1* | 7/2015 | Makin | G06F 11/1402 |
| 9,300,633 B2 | 3/2016 | Acharya et al. | |
| 9,336,103 B1 | 5/2016 | Hasbe et al. | |
| 9,398,092 B1* | 7/2016 | Singhal | H04L 67/1097 |
| 9,501,361 B2 | 11/2016 | Bates | |
| 9,525,592 B2 | 12/2016 | Tung | |
| 9,558,076 B2 | 1/2017 | Durge et al. | |
| 9,575,798 B2 | 2/2017 | Terayama et al. | |
| 9,760,448 B1* | 9/2017 | Per | G06F 3/0619 |
| 9,894,098 B2 | 2/2018 | Sabin | |
| 9,934,054 B2 | 4/2018 | Baset et al. | |
| 10,193,744 B1* | 1/2019 | Gv | H04L 41/12 |
| 2005/0278397 A1* | 12/2005 | Clark | G06F 11/1458 |
| 2009/0222498 A1* | 9/2009 | Lu | G06F 16/10 |
| 2010/0293147 A1 | 11/2010 | Snow et al. | |
| 2011/0087874 A1* | 4/2011 | Timashev | G06F 11/1446 713/100 |
| 2011/0161723 A1 | 6/2011 | Taleck et al. | |
| 2013/0103834 A1 | 4/2013 | Dzerve et al. | |
| 2013/0275673 A1* | 10/2013 | Tiwari | G06F 3/065 711/114 |
| 2013/0326260 A1* | 12/2013 | Wei | G06F 16/119 714/3 |
| 2014/0245423 A1 | 8/2014 | Lee | |
| 2014/0289797 A1 | 9/2014 | Trani | |
| 2015/0229638 A1 | 8/2015 | Loo | |
| 2015/0269237 A1* | 9/2015 | Ries | G06F 11/1458 707/654 |
| 2015/0347242 A1* | 12/2015 | Martos | G06F 11/203 714/19 |
| 2016/0050230 A1* | 2/2016 | Chin | H04L 63/1491 726/23 |
| 2016/0117231 A1 | 4/2016 | Lee et al. | |
| 2017/0099188 A1 | 4/2017 | Chang et al. | |
| 2017/0116231 A1* | 4/2017 | Kripalani | G06F 11/3034 |
| 2017/0149585 A1 | 5/2017 | Norris et al. | |
| 2017/0249221 A1* | 8/2017 | Jain | G06F 11/2028 |
| 2018/0198754 A1 | 7/2018 | Kielhofner et al. | |
| 2019/0095289 A1* | 3/2019 | Kumar | G06F 11/1471 |
| 2019/0235973 A1* | 8/2019 | Brewer | G06F 21/568 |
| 2020/0073763 A1* | 3/2020 | Saini | G06F 11/1469 |

FOREIGN PATENT DOCUMENTS

| | | |
|---|---|---|
| CN | 102932407 A | 2/2013 |
| CN | 104767643 A | 7/2015 |
| CN | 106982259 A | 7/2017 |
| CN | 108234191 A | 6/2018 |
| CN | 108632057 A | 10/2018 |
| EP | 2251783 A1 | 11/2010 |
| JP | 2012068771 A | 4/2012 |
| KR | 20150121891 A | 10/2015 |
| KR | 10-1628195 B1 | 6/2016 |
| WO | WO-2007111086 A1 | 10/2007 |
| WO | WO-2009/155680 A1 | 12/2009 |
| WO | WO-2015109804 A1 | 7/2015 |
| WO | WO-2017161979 A1 | 9/2017 |

OTHER PUBLICATIONS

Alcântara et al "GINJA: One-dollar Cloud-based Disaster Recovery for Databases", Middleware '17, Dec. 11-15, 2017, Las Vegas, NV, USA.

"ACRONIS® Disaster Recovery as a Service", ACRONIS, Downloaded from web site http://dl.acronis.com/u/pdf/Acronis-DRaaS_datasheet_en-US.pdf.

International Search Report on Application No. PCT/US2019/065372 dated Apr. 7, 2020.

* cited by examiner

METHODS, APPARATUSES AND SYSTEMS FOR CLOUD-BASED DISASTER RECOVERY

FIELD

The disclosure generally relates to methods, apparatuses and systems for cloud-based disaster recovery, and more particularly, to methods, apparatuses and systems for managing backup solutions for data backup and recovery of servers.

BACKGROUND

Client workstations within an organization's work facilities use one or more servers to perform various operations associated with the organization. Data on a server can be backed up using one or more backup solutions provided by a backup vendor associated with the server, so that if that server should become inoperable, e.g., crash, become corrupted, or destroyed, the server can be restored to a point in time in a relatively quick manner. Additionally, restoring a server sometimes requires manual/user intervention, which can be quite challenging and/or time consuming for a user in view of the complexity of the backup solutions. As can be appreciated, the more servers that become inoperable, the more time it will take to restore them, as each server has its own unique backup solution.

Accordingly, there is a need for methods, apparatuses and systems for managing backup solutions for data backup and recovery of servers.

SUMMARY

Methods, apparatuses and systems for managing backup solutions for data backup and recovery of servers are disclosed herein.

In accordance with an aspect of the disclosure, there is provided a method for cloud-based disaster recovery. The method includes configuring, at a cloud-based computing platform, a declaration including servers associated with a plurality of selected workloads configured based on information provided by a user for corresponding servers used at a client machine, the declaration including generated steps listing the servers, and restoring the servers for each of the generated steps of the declaration upon receiving, from the client machine, a failure indication associated with the servers.

In accordance with an aspect of the disclosure, there is provided a nontransitory computer readable storage medium having stored thereon instructions that when executed by a processor perform a method for cloud-based disaster recovery. The method includes configuring, at a cloud-based computing platform, a declaration including servers associated with a plurality of selected workloads configured based on information provided by a user for corresponding servers used at a client machine, the declaration including generated steps listing the servers, and restoring the servers for each of the generated steps of the declaration upon receiving, from the client machine, a failure indication associated with the servers.

In accordance with an aspect of the disclosure, there is provided a cloud-based server of a cloud-based computing platform. The cloud-based server includes a processor and a memory coupled to the processor and having stored thereon instructions that when executed by the processor configure the cloud-based server to configure, at a cloud-based computing platform, a declaration including servers associated with a plurality of selected workloads configured based on information provided by a user for corresponding servers used at a client machine, the declaration including generated steps listing the servers, and restore the servers for each of the generated steps of the declaration upon receiving, from the client machine, a failure indication associated with the servers.

BRIEF DESCRIPTION OF THE DRAWINGS

The above and other aspects, features and advantages of certain embodiments of the disclosure will be more apparent from the following detailed description taken in conjunction with the accompanying drawings, in which.

Figure 1:
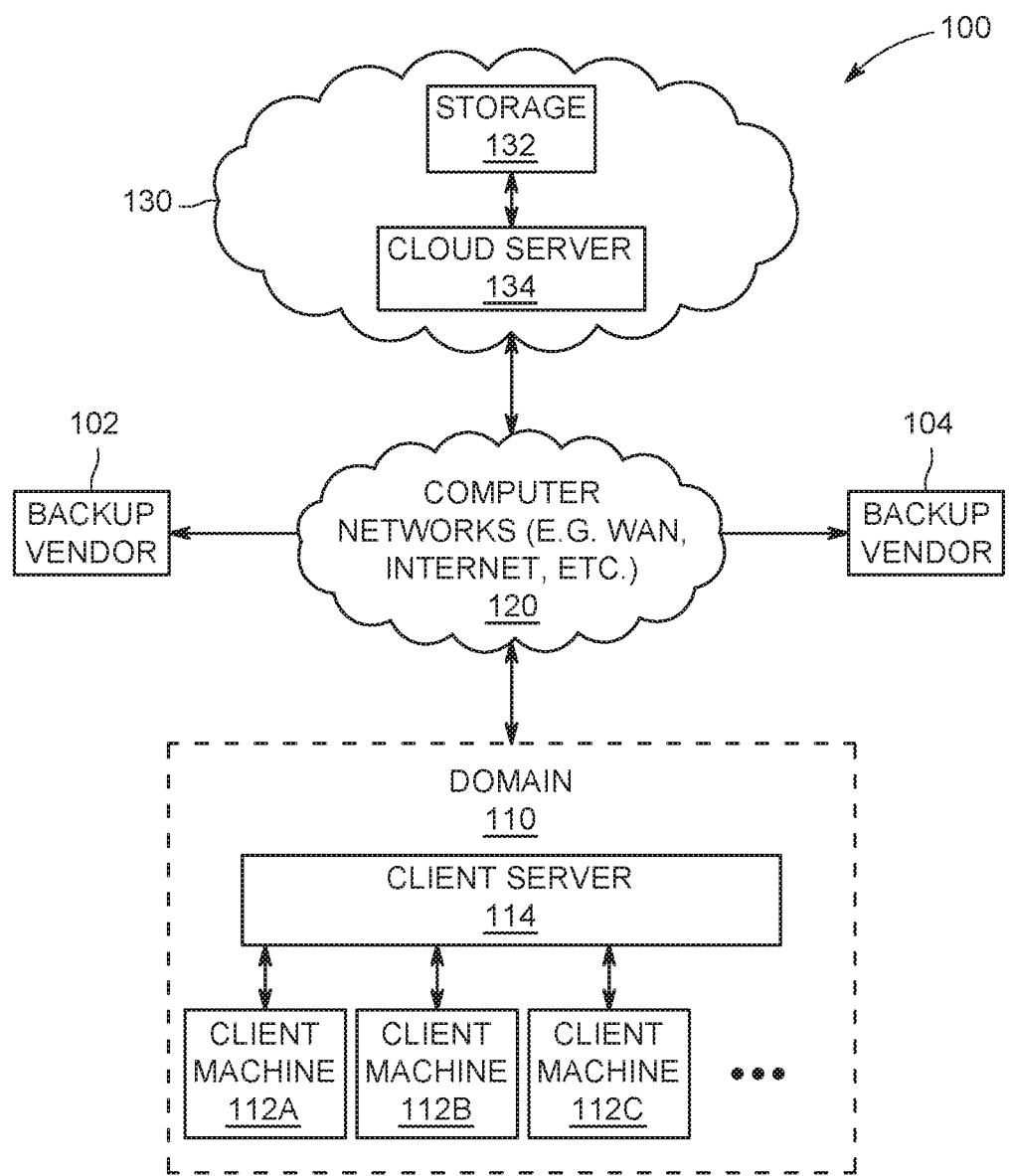
FIG. 1 is a diagram of a cloud-based disaster recovery system that uses a web-based application, in accordance with an embodiment of the disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the disclosure. In the description of the drawings, similar reference numerals are used for similar elements.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the disclosure. In the description of the drawings, similar reference numerals are used for similar elements.

A backup, or the process of backing up, can refer to the copying and/or archiving of computer data so the copied data can be used to restore the original after a data loss event. Backup solution refers to a solution used by a backup vendor. Backup set refers to multiple backups.

Cloud computing can refer to computing that can involve a large number of computers connected through a communication network such as the Internet. Cloud computing can be a form of distributed computing over a network, and can include the ability to run a program or application (e.g., a web application) on many connected computers at the same time.

Cloud storage can refer to a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Disaster Recovery as a service (DRaaS) can refer to the use of physical machines, virtual machines, and/or other resources to perform disaster recovery offered with a cloud-service model.

Virtual machine (VM) can refer to a software-based emulation of a computer. Virtual machines can operate based on the computer architecture and functions of a computer.

Workload as used herein can refer to groups of machines including, for example, servers, networks, firewalls, etc., and all other devices and interconnections between the groups of machines of a client site or sites. For example, a workload can include servers that must be running for a corresponding business function (e.g., accounting services, sales systems, public website, etc.) to be available at the client site. Servers can be organized within a workload in groups called workload steps which allow a user (e.g., a creator of the workload) to specify when an order of servers being restored is important.

FIG. 1 is a diagram of a cloud-based disaster recovery system 100 (system 100) that uses a web-based application, in accordance with an embodiment of the disclosure. The system 100 can provide DRaaS and can be used for data backup and recovery of servers used by client workstations, e.g., for cloud-based recovery of the servers in the event of a disaster.

The system 100 includes a client domain 110, at least one computer network 120 and a cloud-based computing platform 130. The client domain 110 includes at least one client machine/device 112A-1120 (hereinafter collectively referred to as client machines 112) and an onsite client server 114, which partitions tasks or workloads between the client machines 112 and one or more service providers, i.e., servers.

The cloud-based computing platform 130 includes a cloud-based storage device 132 (storage 132) and at least one cloud-based server 134 (cloud server 134). The cloud-based computing platform may also include a virtual machine representing virtualized client workloads. The cloud-based computing platform 130 communicates with the client domain 110 via a computer network 120, which can be a wide-area network (WAN), an Internet and other networks implemented for communication by the client domain 110; a more detailed description of the computer network 120 is described below. In addition, while the storage 132 is illustrated as a single, physical device, the storage 132 can span multiple servers and can be accessed by clients over the internet.

The client domain 110 including the client machines 112 can represent a client workload including servers, networks, firewalls, etc., and all other machines and interconnections of a client domain or domains 110.

A client in the client domain 110 can interact via a user interface of the client server 114 through the computer network 120 with a web-based application and executed via, for example, the cloud server 134 of the cloud-based computing platform 130.

For example, a web-based application as described herein can be used at the cloud server 134 to manage backup information (e.g., backup solutions, backups, backup sets, etc.) provided by one or more backup vendors 102, 104, which are used locally by the client machines 112 at the client domain 110. The backup vendors 102, 104, using the backup information, are configured to restore one or more respective servers 102a, 104a. The backup information can also include other information (e.g., information relating to a previous restore of a server) associated with the backup vendors 102, 104 and/or the servers 102a, 104a. Thus, if the servers 102a, 104a become inoperable, e.g., crash, become corrupted, or destroyed, backup sets stored and managed at/by the cloud server 134 can be used to restore the inoperable servers 102a, 104a back to an original or operable environment. The backup vendors 102, 104 can be products of, for example, Dell EMC, Google, Veritas, Commvault, IBM, etc. While two backup vendors 102, 104 are shown in the FIGS., more or fewer backup vendors 102, 104 can be used by the client machines 112. Similarly, while the servers 102a, 104a are described herein as single servers, users can create workloads comprised of many single servers (e.g. web server, database server, file server, etc.) to represent high level services (e.g. accounting services, sales systems, public website, etc.), as described in greater detail below.

Figure 2:
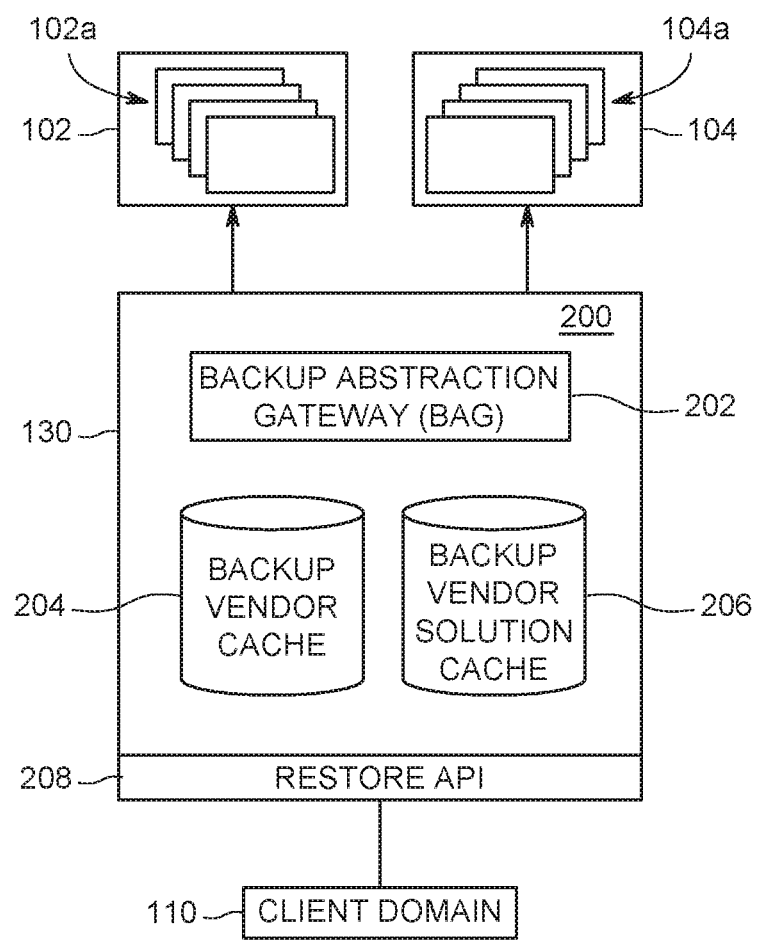
FIG. 2 is a diagram of a cloud-based computing platform including the web-based application for restoring one or more servers used in a client domain, in accordance with an embodiment of the disclosure.

FIG. 2 is a diagram of the cloud-based computing platform 130 including a web-based application 200 for restoring one or more servers used in the client domain 110, in accordance with an embodiment of the disclosure. The web-based application 200 includes a backup abstraction gateway (BAG) 202 that communicates directly with the backup vendors 102, 104 to obtain one or more backups (e.g., a duplicate or clone of data that was present on the servers 102a, 104a prior to the servers 102a, 104a becoming inoperable or corrupted) used for restoring the servers 102a, 104a. Once the BAG 202 obtains the backup sets for the servers 102a, 104a, the BAG 202 stores/manages the backup sets. Particularly, the BAG 202 compiles a listing of the various backup sets for each of the servers 102a, 104a, and stores the compiled listing of backup sets for each backup vendor 102, 104 locally in the cloud-based computing platform 130. For example, as noted above, each of the servers 102a, 104a can have multiple servers and the multiple servers can have their own backup sets. Accordingly, restoring each of the servers 102a, 104a can include using the backup sets for each of the multiple servers of the servers 102a, 104a.

The BAG 202 compiles the listings of backup sets for each backup vendor 102, 104 in one or more data look-up tables using identification (ID) information (e.g., names or other ID information) of all the backup vendors 102, 104 including the servers 102a, 104a that are being managed and their corresponding backup sets to local cache. For illustrative purposes, a list of backup vendors 102, 104 and their corresponding servers 102a, 104a are shown stored in a backup vender cache 204, and a list of corresponding backup vendor solutions are shown stored in a backup vendor solution cache 206. The information contained in the backup vendor cache 204 and the backup vendor solution cache 206 can be also stored in the storage 132 for access thereof by a user via the user interface provided at the client domain 110 (e.g., at the client server 114 and/or the client machines 112), to view, remove, or make changes to the information contained therein.

After the BAG 202 compiles the backup sets for each backup vendor 102, 104, the BAG 202 maintains communication with the backup vendors 102, 104 to obtain updates, if available, for the stored backup sets for each of the backup vendors 102, 104. For example, the BAG 202 can query the backup vendors 102, 104 at a predetermined polling or time interval, which can be set by a user, or a factory default setting can be used. For example, the user can set the BAG 202 to use a polling interval of 1, 5, 10, minutes (or seconds, hours, days, weeks, etc.), or other suitable polling interval, to ensure that the backup sets for the servers 102a, 104a of the backup vendors 102, 104 are up to date. The times at which the updates for the backup are performed by the BAG 202 for the backup vendors 102, 104 can be the same or different. For example, the BAG 202 can update the backup sets for the backup vendor 102 at a first polling/time interval and can update the backup sets for the backup vendor 104 at a second polling/time interval that is different from the first polling/time interval. A user can adjust/change a polling/time interval at which the BAG 202 performs the scheduled updates using the user interface at the client machines 112.

The BAG 202 can store information relating to a previous restore of the servers 102a, 104a. For example, the information can include a date of a previous restore of the servers 102a, 104a, a size of a previous restore of the servers 102a, 104a, an outcome of a previous restore of the servers 102a, 104a (e.g., whether the previous restore of the servers 102a, 104a was successful/unsuccessful), a type of restore of a previous restore of the servers 102a, 104a (e.g., in-place or out-of-place, as described in greater detail below), and a time required to complete a restore using a backup. The BAG 202 can use the stored information to determine if the servers 102a, 104a comply with one or more predetermined objectives, and can present a compliance status of the servers 102a, 104a to a user, which can then take the necessary steps to rectify any compliance issues.

Additionally, the BAG 202 can also store information relating to a previously restored backup. For example, the information relating to a previously restored backup can include a type of the backup (e.g., whether a backup is incremental, differential, full, application based, is for a VM, is for an operating system, etc.). The information relating to a previously restored backup can further include whether a backup used was successful/unsuccessful, various metadata including, but not limited to a size of the backup, a time required to complete a restoration of a server using the backup, etc.

The BAG 202 can store information relating to network information of the servers 102a, 104a, for example, hostname information of the servers 102a, 104a and configuration/type information of the servers 102a, 104a, e.g., database servers, file servers, sharepoint servers, web servers, etc.

The information relating to previous restores of the servers 102a, 104a, relating to a previously restored backup, and network information of the servers 102a, 104a can be stored in local cache of the BAG 202 or the storage 132.

The BAG 202 communicates with a restore application programming interface (API) 208 of the web-based application 200. The restore API 208 receives a request from the client domain 110 for restoring an inoperable (or corrupted) server(s) (e.g., one or both servers 102a, 104a) and transmits this request to the BAG 202, which, in turn, provides the information stored in the backup vendor cache 204 and the backup vendor solution cache 206 to the restore API 208 so that the restore API 208 can restore the inoperable servers that triggered the request to the restore API 208.

The restore API 208 configures workloads 300a and 300b (FIG. 3A) for one or more of business functions including, but not limited to, accounting services, sales systems, public website. Each of these business functions can use one or more of the servers 102a, 104a. Thus, if the servers 102a, 104a become inoperable (or corrupted), the configured workloads 300a, 300b can be used to restore the servers 102a, 104a. The workloads 300a, 330b are compilations of data relating to the servers 102a, 104a including, but not limited to, data relating to external requirements/factors of the servers 102a, 104a, pre-restore scripts that can be executed prior to restoring the servers 102a, 104a, post-restore scripts that can be executed subsequent to restoring the servers 102a, 104a (and/or their corresponding servers), data relating to whether manual intervention (a user input) is required before, during, and/or after restoration of the servers 102a, 104a (and/or their corresponding servers), or other suitable data that can used by the restore API 208 to restore the servers 102a, 104a (and/or their corresponding servers). The data included in the configured workloads 300a, 300b can be provided by and/or to a user using a GUI at the client machines 112, as described in more detail below. For example, a user can provide the restore API 208 with information relating to the servers 102a, 104a (and/or their corresponding servers), and the restore API 208 can use this information to configure the workloads 300a, 300b.

Figure 3A:
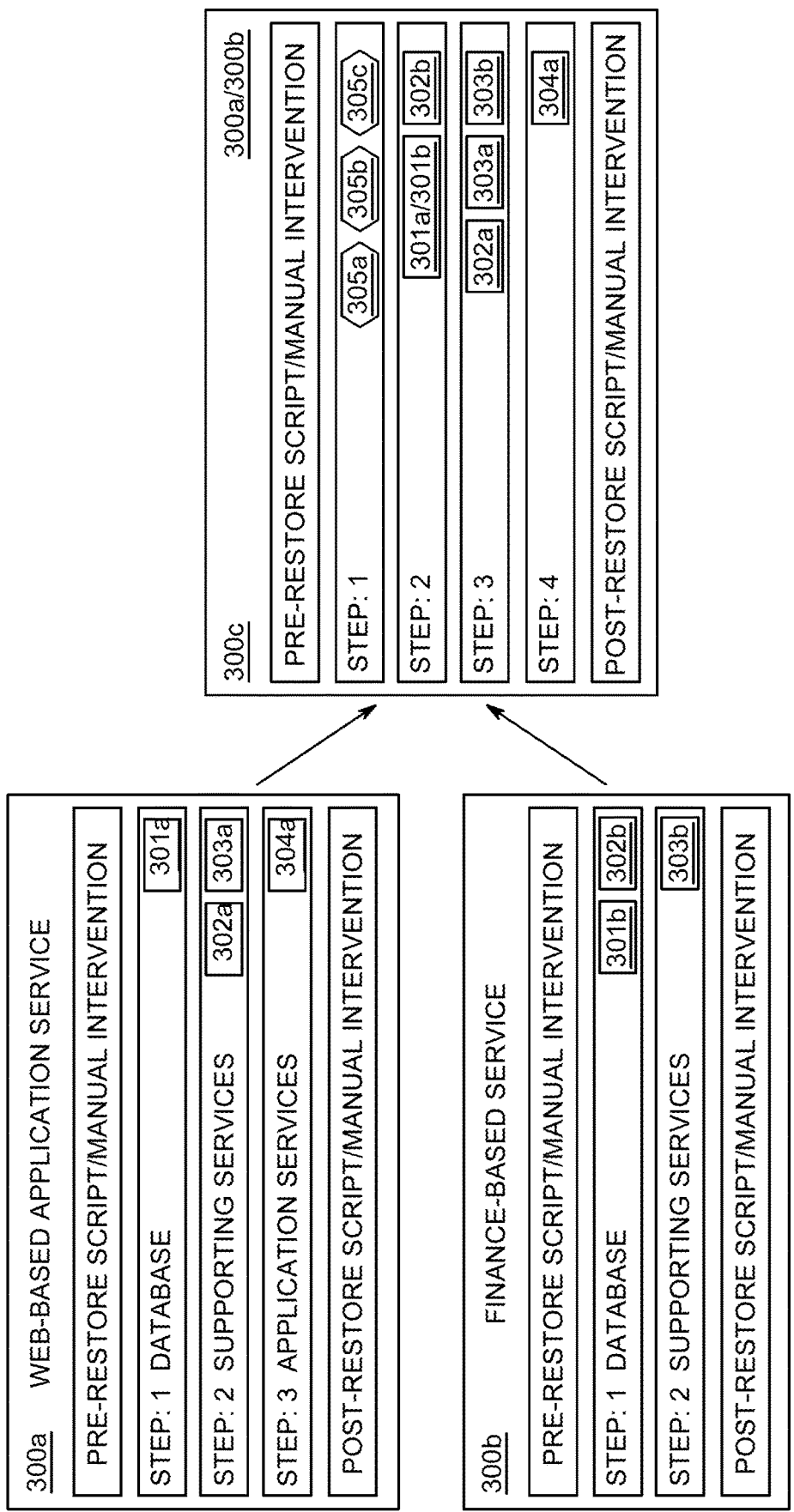
FIG. 3A is a diagram of workloads that are used for creating a declaration used by the web-based application for restoring one or more servers used in a client domain, in accordance with an embodiment of the disclosure.

Continuing with reference to FIG. 3A, for example, based on a user input the restore API 208 generates steps for the workloads 300a, 300b, and the generated steps specify servers associated with each of the generated steps. For example, if the workload 300a were for a web-based application service (as shown in FIG. 3A), the workload 300a could include four servers including a database server 301a (server 301a), a file server 302a (server 302a), a sharepoint server 303a (server 303a), and a web server 304a (server 304a), which can be categorized among one or more steps; three steps are shown FIG. 3A. The servers 301a-304a can be part of the server 102a. Depending on a type of the business function, more or fewer steps and/or servers can be used. For example, if the workload 300b were for a finance-based service (as shown in FIG. 3A), the workload 300b could include three servers including a database server 301b (the server 301b and server 301a are the same servers and are shared by the web-based application service and the finance-based service, but have been shown as independent servers for illustrative purposes), a finance file server 302b (server 302b), and a finance server 303b (server 303b) that can be categorized between two steps.

While the generated workloads 300a, 300b have been described herein as including multiple steps and/or servers, the present disclosure is not so limited. For example, the generated workloads 300a, 300b can include a single step including a corresponding single server.

In FIG. 3A, the workload 300a is configured with a first step (step one) that can be a database step, which can include the server 301a, a second step (step two) that can be a supporting services step, which can include the servers 302a, 303a, and a third step (step three) that can be an application services step, which can include the server 304a. The workload 300b is configured with a first step (step one) that can be a database step, which can include the server 301b and the finance file server 302b and a second step (step two) that can be a supporting services step, which can include the servers 302b, 303b.

As the workloads 300a, 300b are substantially identical, unless otherwise noted, the workloads 300a, 300b are described hereinafter with reference to the workload 300a.

The order in which the restore API 208 configures the steps one-three for restoring the respective servers 301a-

304*a* of the workload 300*a* can vary depending on one or more parameters, e.g., a priority/importance of the servers 301*a*-304*a* (e.g., whether the server 301*a* needs to be restored before the servers 302*a*, 303*a* can be restored, whether user/manual intervention is required to restore the servers 301*a*-304*a*, a type of the restoration (in-place or out-of-place) of the servers 301*a*-304*a*, external requirements of the servers 301*a*-304*a*, etc.

The restore API 208 can also configure the workload 300*a* to include information relating to one or more pre-restore scripts (one or more instructions) and/or post-restore scripts required to restore the servers 301*a*-304*a* (and/or the servers 301*b*-303*b*). The pre-restore scripts are scripts that are automatically executed prior to restoring the servers 301*a*-304*a* and can include, for example, scripts used for changing a domain name system of the servers 301*a*-304*a*), used for running tests to validate that the server servers 301*a*-304*a* are functioning as intended (e.g., the servers 301*a*-304*a* are healthy), used for running an operation against a restored servers 301*a*-304*a*, for example, to finalize a setup of the servers 301*a*-304*a*, update/create a ticket in a ticketing system (e.g., automatically submit a work ticket that can be used to inform a technician or user that manual intervention is required), etc. Likewise, the post-restore scripts are scripts that are automatically executed subsequent to restoring the servers 301*a*-304*a* and can include, for example, scripts used for testing the servers 301*a*-304*a* to determine if restoration of the servers 301*a*-304*a* were successful. The pre-restore scripts/post-restore scripts can be executed locally on the client machines 112, at the restore API 208 (e.g., the cloud-based computing platform 130), or remotely on a system in operable communication with the client machine, e.g., a remotely managed web service, etc.

Manual intervention may be needed to restore the servers 301*a*-304*a* and/or the servers 301*b*-303*b*. Accordingly, the restore API 208 may configure the workload 300*a* to include a request for manual intervention, i.e., request for a user input; a similar request can be added to the workload 300*b*. Thus, prior or subsequent to executing the pre-restore scripts/post-restore scripts, the restore API 208 can query (e.g., using a GUI) a user locally on the client machines 112 for additional information. For example, the additional information that is inputted using the GUI can include a particular backup for the servers 301*a*-304*a*, e.g., a backup other than the most recently updated backup for one or more of the servers 301*a*-304*a* and/or the servers 301*b*-303*b*. That is, the user may want to restore the server 301*a* using a backup corresponding to a first date and time and restore the servers 302*a*, 303*a* using a backup corresponding to a second date and time, which is different from the first date and time. Likewise, the user may want to restore the server 301*b* of the sever 104*a* using a backup corresponding to a first date and time and restore the servers 302*b*, 303*b* using a backup corresponding to a second date and time, which is different from the first date and time.

The restore API 208 can retrieve and store information relating to external requirements, if any, needed to restore the servers 301*a*-304*a*. For example, with respect to the server 302*a*, which is illustrated as a file server in FIG. 3A, access to one or more networks (e.g., a user network and a database network) and access to one or more network file systems (NFS) may be needed to restore the server 302*a*.

The pre-restore scripts/post-restore scripts, external requirements, and/or manual intervention requirements of the servers 301*a*-304*a* can be retrieved by the BAG 202 (e.g., from the backup vendors 102, 104) and can be stored in the BAG 202 along with their corresponding backup sets and accessed by the restore API 208 when the restore API 208 is generating the workloads 300*a*, 300*b*.

After the workloads 300*a*, 300*b* are configured and compliance checks have been completed, which is described in greater detail below, the restore API 208 configures a declaration 300*c* that includes the information of the configured workloads 300*a*, 300*b*. More particularly, like the workloads 300*a*, 300*b*, the restore API 208 configures the declaration 300*c* with one or more generated steps. In FIG. 3A, the declaration 300*c* includes a step one that can include one or more external requirements that are needed to restore the servers 301*a*-304*a*, 301*b*-303*b*. For example, the step one of the declaration of FIG. 3A can include information relating to a finance network server 305*a*, which is used by the server 303*b*, a web network server 305*b*, which is used by the server 304*a*, and a database network server 305*c*, which is used by both the server 301*a* and the server 301*b*.

After the step one is generated, the restore API 208 categorizes the remaining servers 301*a*-304*a*, 301*b*-303*b* of the workloads 300*a*, 300*b* amongst one or more additional steps of the declaration 300*c*. For example, the restore API 208 can generate a step two that includes the servers 301*a*/301*b* (which as noted above are the same database server shared by the web-based application service and the finance-based application service) and the server 302*b*. Next, the restore API 208 generates a step three that includes the servers 302*a*, 303*a*, and 303*b*. Next, the restore API 208 generates a step four that includes the server 304*a*.

Again, the order in which the steps one-four are generated for the declaration 300*c* can depend on the factors described above with respect to the workloads 300*a*, 300*b*, and the pre-restore scripts/post-restore scripts and/or manual intervention requirements of the servers 102*a*, 104*a* (and their corresponding servers) of the workloads 300*a*, 300*b* can also be included in the declaration 300*c*. Moreover, after the declaration 300*c* is configured, the declaration 300*c* can be provided to a user locally on the client machines 112, e.g., using the GUI.

Once the declaration 300*c* is configured, the restore API 208 can restore the servers 301*a*-304*a* in-place or out-of-place. As used herein, in-place refers to restoring a server that is inoperable due to corruption or deletion of data and includes restoring that server to a particular point in time using a corresponding backup. For example, if the server 301*a* becomes corrupted, the server 301*a* is subsequently restored using a previously restored backup for r the server 301*a*. Conversely, out-of-place refers to restoring a server that is inoperable due to destruction (e.g., fire), and includes restoring a different server to a particular point in time using a corresponding backup for the destroyed server. For example, if a first server 302*b* is destroyed, a second server 302*b* is updated (i.e., restored) using a previously restored backup for the first server 302*b*, which includes the backup for the server 302*b*.

The restore API 208 can use the stored backup sets to restore the servers 301*a*-304*a* to an environment corresponding to a particular date and time. For example, the servers 301*a*-304*a* may need to be restored to a first date and time (e.g., using a backup that was obtained a day ago from the backup vendor 102), and the servers 301*b*-303*b* may need to be restored to a second date and time (e.g., using a backup that was obtained from the backup vendor 104 a week ago). Thus, when only one of the two workloads 300*a*, 300*b* needs to be restored, e.g., the workload 300*a* or the workload 300*b*, the restore API 208 can restore that workload, e.g., the workload 300*a*, to the particular date and time, e.g., a day ago. Conversely, if the restore API 208 configures the declaration 300c as in FIG. 3A, i.e., both of the workloads 300a, 300b need to be restored, the restore API 208 can restore the servers 301a-304a and 301b-303b in the workloads 300a, 300b to a date and time that is compatible for all of the servers 301a-304a and 301b-303b, and the backup sets used for restoring each of the servers 301a-304a and 301b-303b will correspond to that particular date and time, or as close to that particular date and time as possible. As noted above, a particular date and time can be selected manually via a user input, or automatically by the restore API 208, depending on how the restore API 208 and/or the workloads 300a, 300b are configured.

Moreover, each individual one of the 301a-304a and 301b-303b may need be restored to an environment corresponding to a particular date and time. For example, the server 301a categorized in step one of the workload 300a may need to be restored to a first date and time; the server 302a categorized in step two of the workload 300a may need to be restored to a second date and time; the server 303a also categorized in step two of the workload 300a may need to be restored to a third date and time; and the server 304a categorized in step three of the workload 300a may need to be restored to a fourth date and time. Likewise, the server 301b categorized in step one of the workload 300b may need to be restored to the first date and time; the server 302b also categorized in step one of the workload 300b may need to be restored to the second date and time; and the server 303b categorized in step three of the workload 300b may need to be restored to the third date and time.

For example, if the server 301a became corrupted because of ransomware dating back eight hours ago, restoring the server 301a with a most recent updated backup (e.g., a backup from four hours ago) would not prove advantageous as the server 301a would be restored with the backup including the ransomware. Similarly, if the server 301b were destroyed in a fire, the server 301b may need be restored using the most recent backup. Accordingly, the restore API 208 can restore the servers 301a, 301b to a date and time that is compatible for both the servers 301a, 301b, e.g., using a backup updated more than eight hours ago.

Figure 3B:
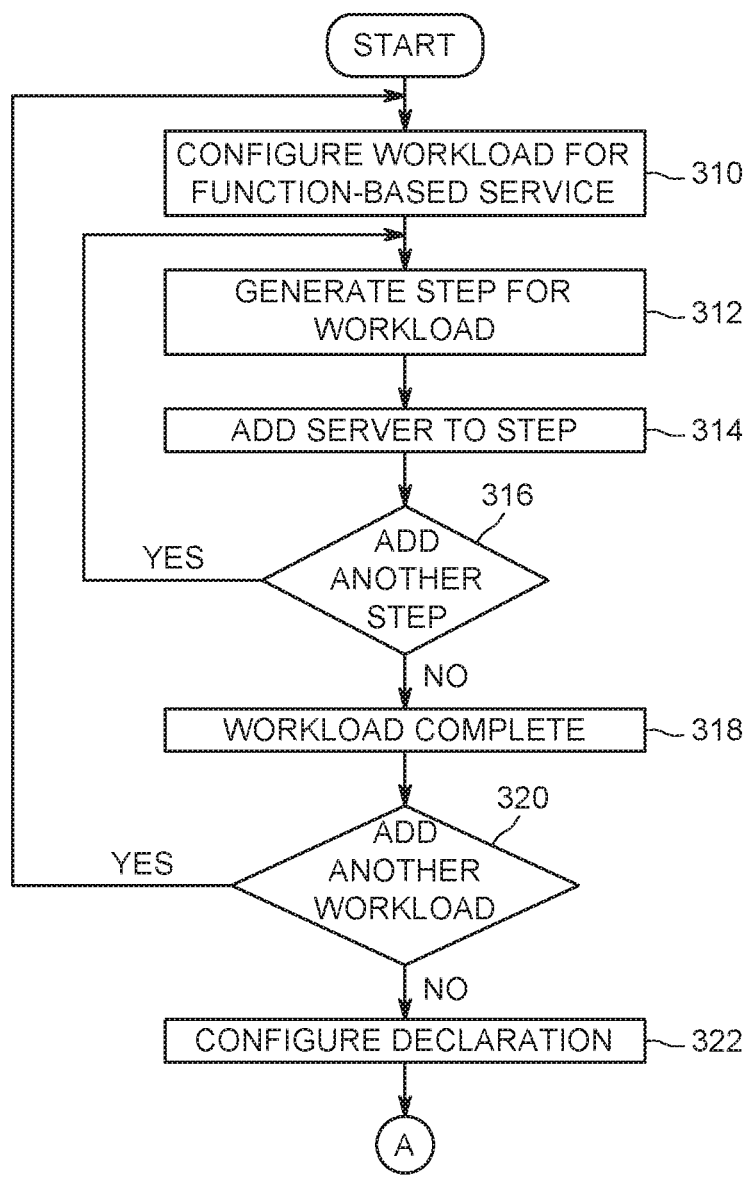
FIGS. 3B-3D are flowcharts of a method for cloud-based disaster recovery.

FIG. 3B depicts a flowchart of method for cloud-based disaster recovery, in accordance with an embodiment of the disclosure. It is assumed that all functions performed by the web-based application 200 are controlled by the cloud server 134.

Initially, the client server 114 transmits a request to the restore API 208, and the BAG 202 begins receiving the backup sets for the backup vendors 102, 104 being used locally at the client machines 112; the information can include the names of the servers (e.g., servers 301a-304a and the servers 301b-303b) associated with the backup vendors 102, 104. The BAG 202 complies a list of the backup vendors 102, 104 and their corresponding servers 301a-304a and 301b-303b and the backup sets of the backup vendors 102, 104, and stores the compilation in the backup vendor cache 204 and in the backup vendor solution cache 206, as described above. Once the requisite information is provided to the BAG 202, the BAG 202 manages the various backup sets of the backup vendors 102, 104 and uses the managed backup sets to restore the servers 301a-304a and 301b-303b, if one should become inoperable.

For example, the BAG 202 requests, at one or more of the above-described polling intervals, that the backup vendors 102, 104 provide updates relating to the backup sets for the servers 301a-304a and 301b-303b. In response to the request, the BAG 202 receives the updated backup sets for the corresponding servers 301a-304a and 301b-303b from the backup vendors 102, 104. The received updated backup sets for the corresponding servers 301a-304a and 301b-303b are stored in the backup vendor solution cache 206 and replace the previous restored backups for the corresponding servers 301a-304a and 301b-303b. The previous restored backups for the servers 301a-304a and 301b-303b can be stored in the storage 132 for viewing by a user at the client domain 110, or can be simply deleted. In the former instance, the BAG 202 can store any number of previous restored backups for the servers 301a-304a and 301b-303b. For example, the BAG 202 can store 1, 2, 3, 4, and so on of previously stored backup sets for the servers 301a-304a and 301b-303b, the number of previously restored backups that the BAG 202 stores can depend on a user setting, storage capabilities of the storage 132, a manufacturer's preference, etc.

If any of the 301a-304a and 301b-303b should become inoperable (e.g., in-place or out-of-place), a failure indication is generated locally at the domain server 114 of the domain 110 and transmitted to and received at the restore API 208; generation/transmission of the failure indication can be performed automatically or manually—depending on a specific configuration of the web-based application 200, a particular reason that a server fails, etc. For example, failure of any of the servers 301a-304a and 301b-303b can automatically trigger the domain server 114 to generate the failure indication and transmit the failure indication to the restore API 208. Conversely, if the failure indication is sent manually (e.g., by a user) to the restore API 208, a user interface, such as the GUI described below, can be provided at the client domain 110 (e.g., at the client machines 112) and used to receive a user input for requesting a manual restore of one of the inoperable servers 301a-304a and 301b-303b from the restore API 208.

For illustrative purposes, it is assumed that the failure indication was transmitted automatically for the servers 301a-304a and 301b-303b (e.g., associated with the web-based application service and finance-based service of FIG. 3A) that have become inoperable and need to be restored in-place.

Accordingly, upon receiving the failure indication at the restore API 208, the restore API 208 begins restoring the servers 301a-304a and 301b-303b by configuring the workloads 300a, 300b at 310. Prior to configuring the workloads 300a, 300b, the restore API 208 can request a user at the client machines 112 to provide the names of the servers 301a-304a and 301b-303b that need to be restored, and any other information (e.g., a backup other than the most recently updated backup, etc.) For example, based on the user input, and with respect to the workload 300a, the restore API 208 generates the step one at 312, e.g., the database step, and adds all the servers that should be categorized in the step one, e.g., the server 301a at 314. At 316, the restore API 208 determines if more steps are needed to configure the workload 300a. If yes at 316, the restore API 208 loops back to 312 and continues performing 312-316 until there are no more steps/servers to be generated/categorized, e.g., generates steps two and three and categorizes their respective servers 302a-304a. If no at 316, at 318, the workload 300a is completed.

At 320, the restore API 208 determines if there are more workloads. If yes at 320 (e.g., to configure the workload 300b), the restore API 208 loops back to 310 and repeats 310-318 until there are no more workloads to be configured.

If no at 320, i.e., after the workloads 300a, 300b have been configured at 318, the restore API 208 uses the information included in the workloads 300a, 300b to configure the declaration 300c at 322. Particularly, at 324 of FIG. 3C the restore API 208 begins configuring the declarations 300c by combining the workloads 300a, 300b. More particularly, at 326 the restore API 208 generates the step one and at 328 adds the servers 305a-305c, which are network servers that are required to be restored prior to restoring the servers 301a-304a and 301b-303b of the servers 102a, 104a. At 330, the restore API 208 determines if another step needs to be generated. If yes at 330, the restore API 208 loops back to 326 and continues performing 326-330 until there are no more steps/servers to be generated/categorized, i.e., generates steps two-four and categorizes their respective servers 301a-304a and 301b-303b.

Once the declaration 300c is completed at 332, the restore API 208 uses the information included in the declaration 300c to restore the servers 301a-304a and 301b-303b, at 334. More particularly, the restore API 208 can request the BAG 202 to provide the most recent updated backups for the servers 301a-304a, 301b-303b, 305a-305c stored in the backup vendor solution cache 206 and can restore the inoperable servers 301a-304a and 301b-303b using the provided backup solution(s) from the BAG 202.

For example, the most recent backup solution for the servers 301a-304a and 301b-303b can include information relating to the data that was present on the servers 301a-304a, 301b-303b, 305a-305c prior to the servers 301a-304a and 301b-303b becoming inoperable, pre-restore scripts/post-restore scripts, any information relating to any external requirements and/or whether manual intervention is required to restore the subs-servers 301a-304a and 301b-303b. Accordingly, the restore API 208 uses the received backup solutions from the BAG 202 and restores the servers 301a-304a and 301b-303b by restoring each of the servers 301a-304a, 301b-303b, 305a-305c in each of the generated steps one-four.

Figure 3C:
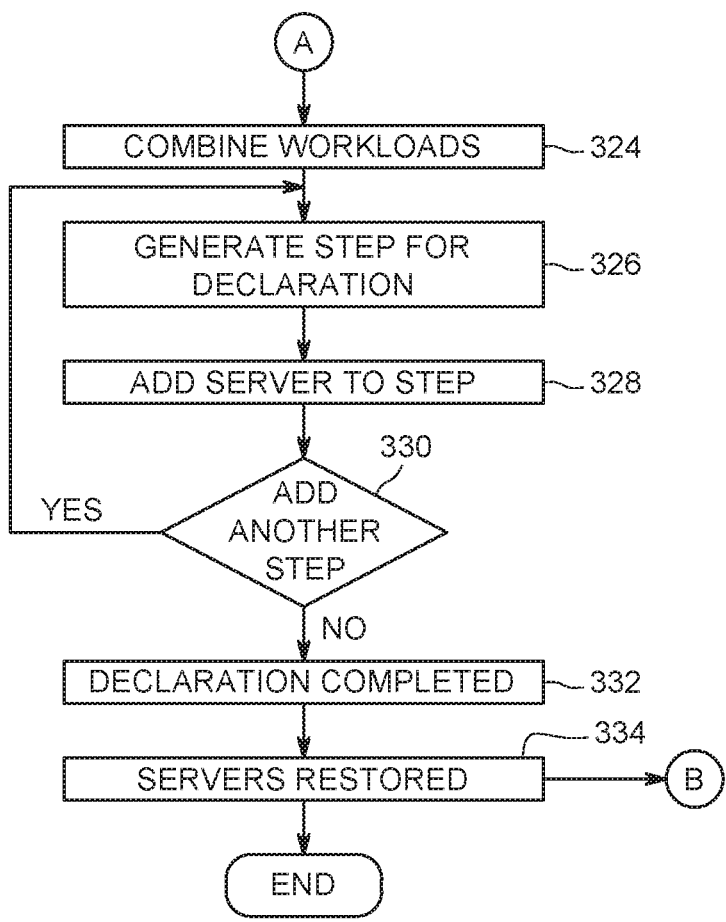
Figure 3D:
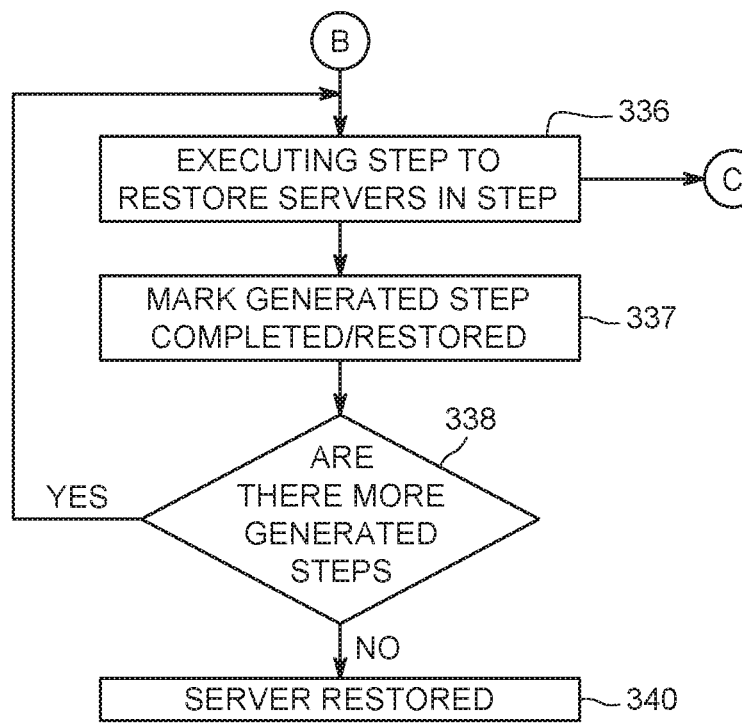
Figure 3D:
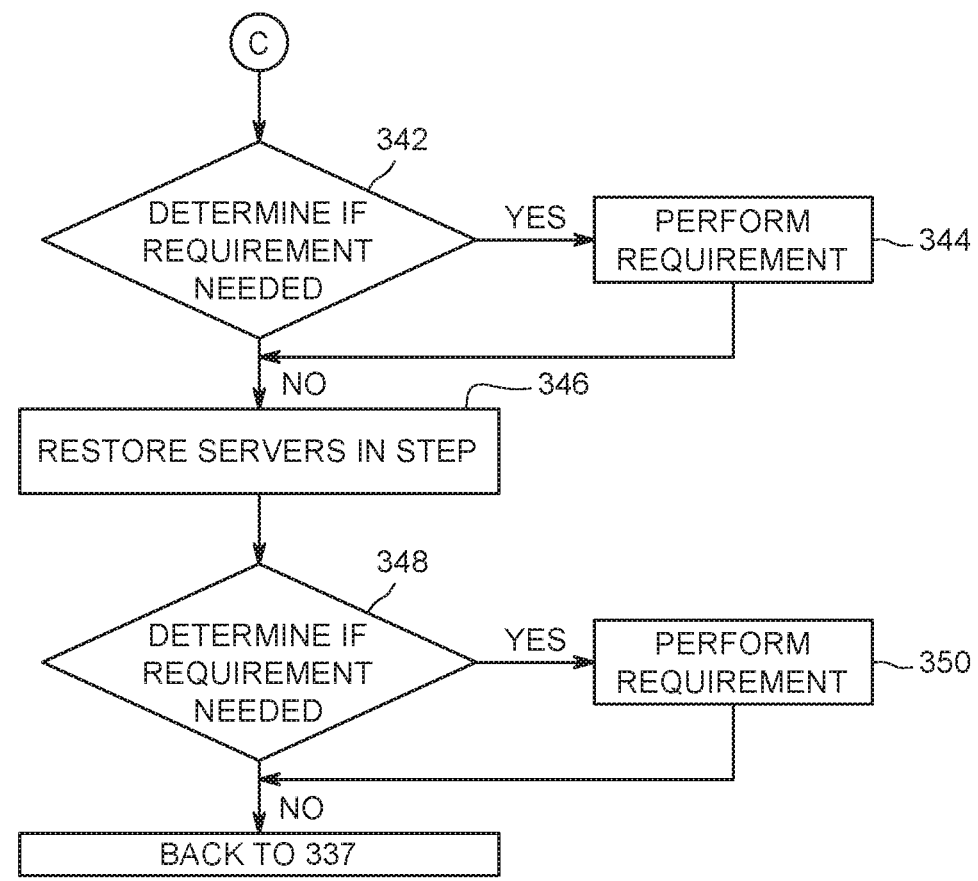

FIG. 3D illustrates an example of a method for restoring the servers 301a-304a, 301b-303b, 305a-305c using the declaration 300c (and/or the workloads 300a/300b).

For example, when the declaration 300c is configured as shown in FIG. 3A, the restore API 208 can execute the step one of the declaration 300c to first restore the servers 305a-305c generated in the step one using the most recently updated backups (or other backup solution) for these servers at 336. After the servers 305a-305c are restored, the restore API 208 can mark step one as completed/restored at 337; this operation, however, is optional, but can be helpful if manual intervention is required during a restoration process of a server or if manual restoration of a server is being performed, as described in more detail below.

Thereafter, at 338 the restore API 208 determines if there are more generated steps. If yes at 338, such as in FIG. 3A, the restore API 208 continues sequentially executing the steps so that the servers categorized in the remaining steps of the declaration can be restored. For example, since the configured declaration 300c has four steps one-four, after the determination yes at 338, the restore API 208 executes step two and restores the servers 301a (301b which is the same server as 301a) and 302b of the workloads 300a, 300b, respectively. When two or more servers are categorized in a step, such as in the step two (and steps one and three), the restore API 208 can restore each server 301a and 302b parallelly (e.g., restore both the servers 301a and 302b prior to executing the steps three/four) using the corresponding most recently updated backups for the servers 301a, 302b (or other backups, e.g., manually chosen) provided by the BAG 202. After the servers 301a, 302b in the step two are restored, the step two can be marked as completed/restored at 337. Subsequently, the restore API 208, loops back to 336, and then restores the servers 302a, 303a and 303b in the step three using the most recently updated backups (or other backup, e.g., manually chosen) for the servers 302a, 303a and 303b provided by the BAG 202. At this point, the sever 104a will be completely restored as all the servers 301b-303b will have been restored at the completion of step three. Conversely, the restore API 208 will have to loop back one more time to 336-338 to restore the server 304a of the step four. A determination no at 338 indicates that restoration of the servers 301a-304a, 301b-303b, 305a-305c is completed, and the servers 102a, 104a are restored at 340.

When performing 336-338, i.e., executing the steps one-four, the restore API 208 determines if the backups included any of the aforementioned requirements, e.g., one or more pre-restore scripts requirement, external requirements, manual intervention requirements, before executing the steps one-three.

For example, during execution of step two at 336, the restore API 208 at 342 may determine if a pre-restore script needs to be executed prior to restoring the server 301a. If yes at 342, the restore API 208 executes the pre-restore script at 344. For example, at 344 the restore API 208 can perform a pre-restore script that includes changing a domain name system of the servers 301a-304a. If no at 342, the restore API 208 restores the server 301a at 346.

Thereafter, the restore API 208 at 348, may determine if any other requirements are needed after the server 301a is restored. For example, the restore API 208 at 348 may determine if a post-restore script needs to be executed subsequent to restoring the server 301a. If yes at 348, the restore API 208 executes the post-restore script at 350. For example, at 350 the restore API 208 can perform a post-restore script that includes testing a server and/or servers to determine if restoration of that server and/or servers was successful. After the post-restore script is executed, the method loops back to 337.

While the method of FIG. 3C has been described herein with respect to the pre-restore scripts/post-restore scripts, the present disclosure is not so limited. For example, the manual intervention requirements and/or the external requirements can also be determined/executed in addition to the pre-restore scripts/post-restore scripts. For example, if manual intervention is required (yes at 342) to continue with the restoration of the server 301a (e.g., if a backup other than the most recently updated backup is to be used for restoring the server 301a), at 344 a user is requested to input the required information to the restore API 208; the restore API 208 can mark the step two as incomplete until the required information is provided/inputted to the restore API 208 at 344. After the required information is inputted at 344, the restore API 208 restores the server 301a at 346 and the method continues to 337, as described above.

The restore API 208 may also be configured to automatically pause prior to executing a subsequent step. For example, after the servers 301a, 302b of the step two are restored, prior to the restore API 208 executing the step three at 336, at 342 the restore API 208 may be configured to automatically query a user for information relating to the subs-servers 302a, 303a, 303b in the step three (e.g., information relating to a restore out-of-place or if a backup other than the most recently updated backup is to be used for the servers 302a, 303a, 303b). The user can provide/input the requested information to the restore API 208 at 344, which can then restore the servers 302a, 303a, 303b and can proceed to 346, as described above.

Similarly, the restore API 208 can be configured to automatically pause prior to executing a subsequent step for determining if one of the above-mentioned external requirements needs to be considered, such as, access to one or more networks (e.g., a user network and a database network) and access to one or more NFS may be needed to restore the server 302*a*.

Figure 5:
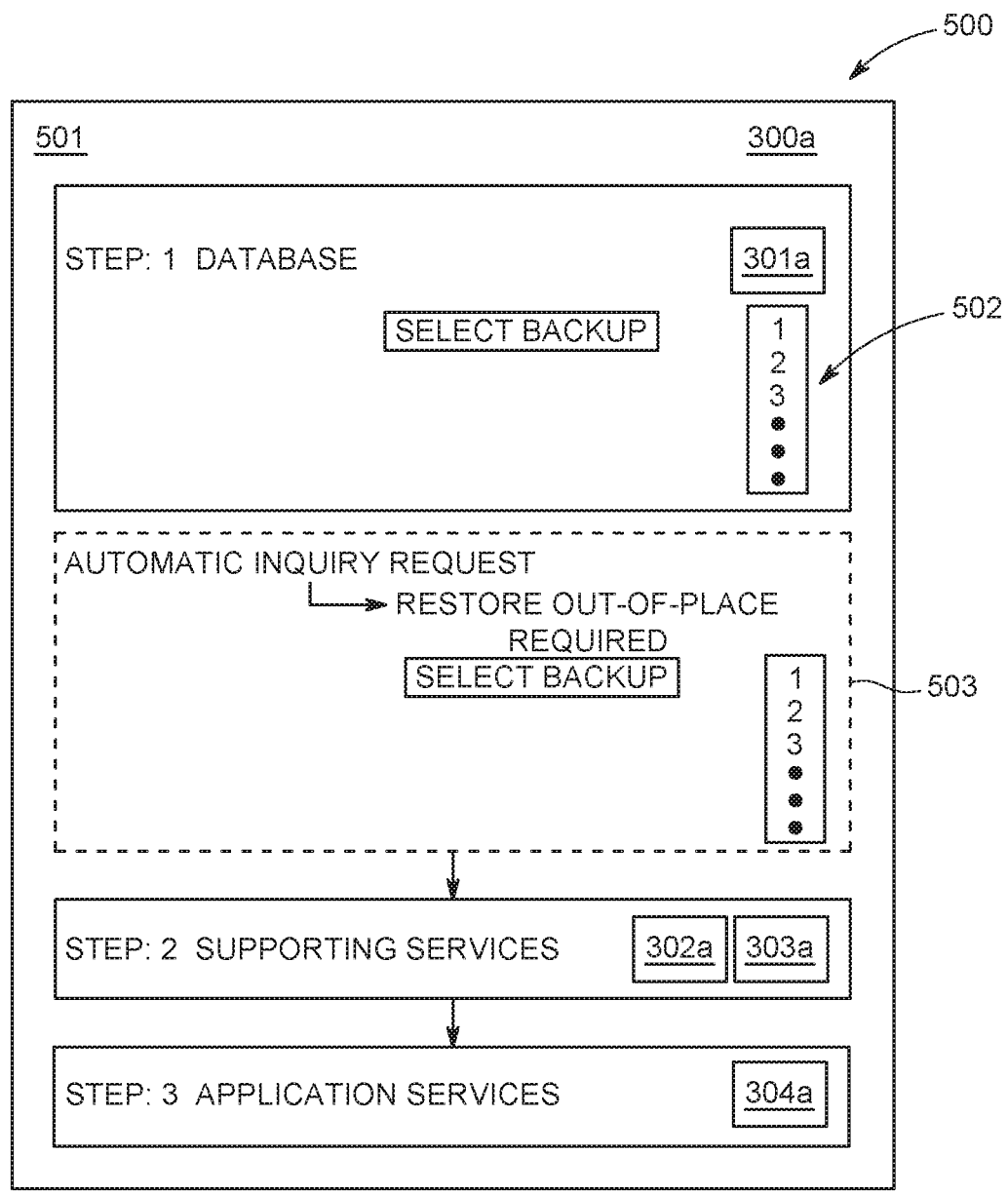
FIG. 5 is a diagram of a graphical user interface (GUI), in accordance with an embodiment of the disclosure.

As noted above, the restore API 208 can provide one or more GUIs when manual intervention is required at 344/350 (i.e., a yes at 342/348 for restoring/after restoring one or more of the servers 301*a*-304*a*, 301*b*-303*b*, 305*a*-305*c*. The restore API 208 can, for example, provide a user with one or more types of GUIs which can be displayed on a display of the client machines 112. For example, a GUI 500 (FIG. 5) can include the information used to configure the workloads 300*a*, 300*b* and/or the declaration 300*c* of FIG. 3A and can include any one of labels, text fields, buttons, text area, checkboxes, radio buttons, drop-down lists, etc. For illustrative purposes, the GUI 500 is shown including a text area 501 including an ID of the inoperable server (e.g., server 102*a*) and a listing of the generated steps one-three. Each listing of the steps one-three can include a drop-down list 502 including a listing of the stored backups or backup sets (including the most recently updated backup, which will be shown as the first backup) for the inoperable server, which can be selected by a user for restoring the inoperable server. Also, when the restore API 208 is configured to automatically pause after a step is completed, e.g., (yes at 342) after the step two is completed and prior to executing the step three, the GUI 500 can include an automatic inquiry request tab 503 (shown in phantom) for receiving user information. For example, if the restore API 208 is performing an out-of-place restore, a user may be requested to select a backup solution other than the most recently updated backup solution.

When only one of the servers 301*a*-304*a*, 301*b*-303*b*, 305*a*-305*c* needs to be restored (e.g., the server 301*a* needs to be restored), the restore API 208 can be configured to restore the server 301*a* by simply using the configured workload 300*a*, without configuring the declaration 300*c*, i.e., when there is no need to combine workloads; however, the disclosure is not so limited as the restore API 208 can be configured to configure the declaration 300*c* for one or more workloads.

A system 100 that uses the methods described herein can restore inoperable servers in a relatively quick manner, when compared to conventional methods used to restore inoperable servers. More particularly, since the stored/updated backup sets for corresponding backup vendors are readily available at the BAG 202, the restore API 208 is not required to query each individual backup vendor for the most recent backup when a server becomes inoperable. Moreover, the BAG 202 allows a user to track changes in the backup information in a common manner regardless of the backup solution(s). Furthermore, the information provided in the workloads 300*a*, 300*b*, and the declaration 300*c* and used by the restore API 208 can also be provided to a user so that that the user can restore a server including its corresponding servers in a relatively quick and easy manner at a client machine.

Figure 4:
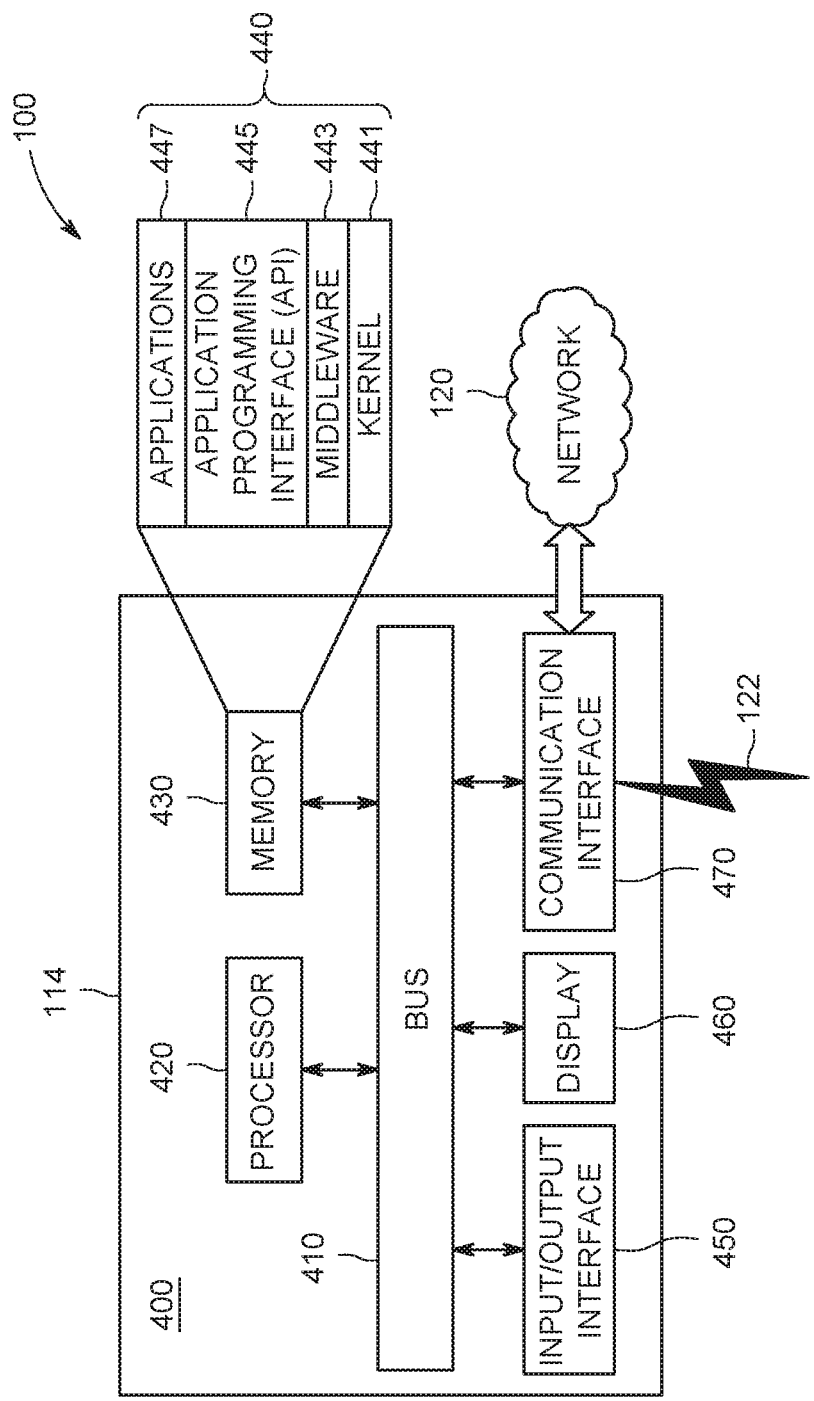
FIG. 4 is a diagram of an electronic device, in accordance with an embodiment of the disclosure.

FIG. 4 is a diagram of an electronic device, in accordance with an embodiment of the disclosure. The electronic device performs the above-described functions and processes of the client server 114 and/or the cloud server 134.

The electronic device 400 includes a bus 410, a processor or controller 420, a memory 430 (or storage, e.g., the storage 132), an input/output interface 450, a display 460, and a communication interface 470. At least one of the above-described components may be omitted from the electronic device 400 or another component may be further included in the electronic device 400.

The bus 410 may be a circuit connecting the above-described components 420, 430, 450, 460, and 470 and transmitting communications (e.g., control messages and/or data) between the above-described components.

The processor 420 may include one or more of a central processing unit (CPU), an application processor (AP), and a communication processor (CP). The processor 420 controls at least one of the other components of the electronic device 400 and/or processing data or operations related to communication.

The memory 430 may include volatile memory and/or non-volatile memory. The memory 430 stores data or commands/instructions related to at least one of the other components of the electronic device 400. The memory 430 stores software and/or a program module 440 (e.g., web-based application 200). For example, the program 440 may include a kernel 441, middleware 443, an API 445 (e.g., a restore API 208), application programs 447 (or applications, e.g., web-based application 200). The kernel 441, the middleware 443 or at least part of the API 445 may be called an operating system.

The kernel 441 controls or manages system resources (e.g., the bus 410, the processor 420, the memory 430, etc.) used to execute operations or functions of other programs (e.g., the middleware 443, the API 445, and the applications 447). The kernel 441 provides an interface capable of allowing the middleware 443, the API 445, and the applications 447 to access and control/manage the individual components of the electronic device 400.

The middleware 443 may be an interface between the API 445 or the applications 447 and the kernel 441 so that the API 445 or the applications 447 can communicate with the kernel 441 and exchange data therewith. The middleware 443 is capable of processing one or more task requests received from the applications 447. The middleware 443 assigns a priority for use of system resources of the electronic device 400 (e.g., the bus 410, the processor 420, the memory 430, etc.) to the application 447. The middleware 443 processes one or more task requests according to a priority assigned to at least one application program, thereby performing scheduling or load balancing for the task requests. For example, in the event of one of the servers 102*a*, 104*a* becoming inoperable, the middleware 443 can assign a high priority for the tasks required to restore the servers 102*a*, 104*a* to an operation state.

The API 445 may be an interface that is configured to allow the applications 447 to control functions provided by the kernel 441 or the middleware 443. The API 445 may include at least one interface or function (e.g., instructions) for file control, window control, image process, text control, or the like. For example, during a restore operation, the API 445 allows the applications 447 to display one or more user interfaces that allow a user to navigate through the BAG 202 of web-based application 200 to enter the above-described information associated with the backup vendors 102, 104.

The input/output interface 450 is capable of transferring instructions or data, received from the user or external devices, to one or more components of the electronic device 101. The input/output interface 450 is capable of outputting instructions or data, received from one or more components of the electronic device 400, to the user or external devices. The input/output device 450 can be configured to create one or more GUIs for receiving a user input, as described above.

The display 460 may include a liquid crystal display (LCD), a flexible display, a transparent display, a light emitting diode (LED) display, an organic LED (OLED) display, micro-electro-mechanical systems (MEMS) display, an electronic paper display, etc. The display 460 displays various types of content (e.g., texts, images, videos, icons, symbols, etc.). The display 460 may also be implemented with a touch screen. The display 460 receives touches, gestures, proximity inputs or hovering inputs, via a stylus pen, or a user's body. Accordingly, the display 450 can be used to receive a user input on one or more GUIs, e.g., the GUI 500.

The communication interface 470 establishes communication between the electronic device 400 and an external device (e.g., backup vendors 102, 104) connected to the network 120 via wired or wireless communication.

Wireless communication may employ, as cellular communication protocol, at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 122. Short-wireless communication 122 may include at least one of wireless fidelity (Wi-Fi), Bluetooth (BT), near field communication (NFC), magnetic secure transmission (MST), etc. Wired communication may include at least one of universal serial bus (USB), high definition multimedia interface (HDMI), recommended standard 232 (RS-232), and plain old telephone service (POTS). The network 120 may include at least one of a telecommunications network, e.g., a computer network (e.g., local area network (LAN) or WAN), the Internet, and a telephone network.

While the domain server 114 and the cloud server 134 have been described herein as communicating with the backup vendors 102, 104 over the network 120, the disclosure is not so limited. For example, one or both the domain server 114 and the cloud server 134 can communicate with each other and/or the backup vendors 102, 104 over the short-wireless communication 122.

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

Furthermore, while the methods described herein have been described for use with the cloud-based computing platform 130, the disclosure is not so limited. For example, the methods described herein can be performed locally using the client server 114 in the client domain 110. Additionally, one or more of the sequences in the methods described herein can be omitted, or one or more sequences not herein described can be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for cloud-based disaster recovery, the method comprising:
    configuring, at a cloud-based computing platform, a declaration including servers associated with a plurality of selected workloads configured based on information provided by a user for corresponding servers used at a client machine, wherein configuring the declaration comprises merging generated workload steps of the plurality of selected workloads and categorizing the servers for generating steps of the declaration;
    upon receiving, from the client machine, a failure indication associated with the servers, determining for each of the categorized servers in each of the generated steps of the declaration a compatible date and time for each of the categorized servers based on an inoperability of each of the categorized servers;
    restoring each of the categorized servers using a backup corresponding to the determined compatible date and time; and
    executing a pre-restore script including one of updating or creating a work ticket in a ticketing system that can be used to inform a technician or user that manual intervention is required in restoring the servers,
    wherein the manual intervention comprises receiving an input from the user for selecting a backup other than a most recently updated backup.

2. The method of claim 1, further comprising calculating requirements for the plurality of selected workloads.

3. The method of claim 1, further comprising executing a post-restore script including testing the servers to determine if restoration of the servers was successful.

4. The method of claim 1, further comprising providing a graphical user interface at the client machine for receiving a manual input for generating the steps of the declaration.

5. The method of claim 1, wherein the corresponding backups are stored at the cloud-based computing platform, for the servers.

6. A nontransitory computer readable storage medium having stored thereon instructions that when executed by a processor perform a method for cloud-based disaster recovery, the method comprising:
    configuring, at a cloud-based computing platform, a declaration including servers associated with a plurality of selected workloads configured based on information provided by a user for corresponding servers used at a client machine, wherein configuring the declaration comprises merging generated workload steps of the plurality of selected workloads and categorizing the servers for generating steps of the declaration;
    upon receiving, from the client machine, a failure indication associated with the servers, determining for each of the categorized servers in each of the generated steps of the declaration a compatible date and time for each of the categorized servers based on an inoperability of each of the categorized servers;
    restoring each of the categorized servers using a backup corresponding to the determined compatible date and time; and
    executing a pre-restore script including one of updating or creating a work ticket in a ticketing system that can be used to inform a technician or user that manual intervention is required in restoring the servers,
    wherein the manual intervention comprises receiving an input from the user for selecting a backup other than a most recently updated backup.

7. The nontransitory computer readable storage medium of claim 6, wherein the method further comprises calculating requirements for the plurality of selected workloads.

8. The nontransitory computer readable storage medium of claim 6, wherein the method further comprises executing a post-restore script including testing the servers to determine if restoration of the servers was successful.

9. The nontransitory computer readable storage medium of claim 6, wherein the method further comprises providing a graphical user interface at the client machine for receiving a manual input for generating the steps of the declaration.

10. The nontransitory computer readable storage medium of claim 6, wherein the corresponding backups are stored at the cloud-based computing platform, for the servers.

11. A cloud-based server of a cloud-based computing platform comprising:
   a processor; and
   a memory coupled to the processor and having stored thereon instructions that when executed by the processor configure the cloud-based server to:
   configure, at a cloud-based computing platform, a declaration including servers associated with a plurality of selected workloads configured based on information provided by a user for corresponding servers used at a client machine, wherein configuring the declaration comprises merging generated workload steps of the plurality of selected workloads and categorizing the servers for generating steps of the declaration;
   upon receiving, from the client machine, a failure indication associated with the servers, determine for each of the categorized servers in each of the generated steps of the declaration a compatible date and time for each of the categorized servers based on an inoperability of each of the categorized servers;
   restore each of the categorized servers using a backup corresponding to the determined compatible date and time; and
   execute a pre-restore script including one of updating or creating a work ticket in a ticketing system that can be used to inform a technician or user that manual intervention is required in restoring the servers,
   wherein the manual intervention comprises receiving an input from the user for selecting a backup other than a most recently updated backup.

12. The cloud-based server of claim 11, wherein the instructions further configure the cloud-based server to calculate requirements for the plurality of selected workloads.

13. The cloud-based server of claim 11, wherein the instructions further configure the cloud-based server to execute a post-restore script including testing the servers to determine if restoration of the servers was successful.

14. The cloud-based server of claim 11, wherein the instructions further configure the cloud-based server to provide a graphical user interface at the client machine for receiving a manual input for generating the steps of the declaration, and
   wherein when the cloud-based server restores the servers, the cloud-based server uses corresponding backups, which are stored at the cloud-based computing platform, for the servers.

* * * * *